United States Patent [19]
Greatbatch et al.

[11] 3,994,747
[45] Nov. 30, 1976

[54] LITHIUM-BROMINE CELL

[75] Inventors: Wilson Greatbatch, Clarence; Ralph T. Mead, Kenmore; Robert L. McLean, Clarence; Frank Rudolph, Depew; Norbert W. Frenz, North Tonawanda, all of N.Y.

[73] Assignee: Eleanor & Wilson Greatbatch Foundation, Akron, N.Y.

[22] Filed: Sept. 29, 1975

[21] Appl. No.: 617,280

[52] U.S. Cl. .............................. 429/199; 429/218
[51] Int. Cl.² ........................................ H01M 4/36
[58] Field of Search .......... 136/83 R, 100 R, 100 T, 136/20, 153, 155, 6 F, 6 L, 6 EF

[56] References Cited
UNITED STATES PATENTS

| | | | |
|---|---|---|---|
| 3,455,742 | 7/1969 | Rao | 136/83 R |
| 3,723,183 | 3/1973 | Greatbatch | 136/83 R |
| 3,817,791 | 6/1974 | Greatbatch et al. | 136/83 R |
| 3,824,130 | 7/1974 | Liang | 136/83 R |
| 3,837,920 | 9/1974 | Liang et al. | 136/83 R |
| 3,879,220 | 4/1975 | Will et al. | 136/83 R |

OTHER PUBLICATIONS
Weininger et al., "Nonaqueous Lithium-Bromine Secondary Galvanic Cell," J. Electrochem. Soc.: Electrochem. Science & Technology, vol. 121, No. 3, Mar. 1974, pp. 315–318.

Primary Examiner—John H. Mack
Assistant Examiner—C. F. Lefevour
Attorney, Agent, or Firm—Christel & Bean

[57] ABSTRACT

A solid electrolyte primary cell comprising a lithium anode, a bromine cathode and a lithium bromide electrolyte. A solid lithium element operatively contacts the cathode material, and one form of cathode material is a charge transfer complex of an organic donor component material and bromine. The organic donor component material can be poly-2-vinyl pyridine. Another cathode material is liquid bromine. The surface of the lithium anode element which operatively contacts the cathode material can be provided with a coating of an organic electron donor component material. When the lithium anode operatively contacts the bromine cathode, a solid lithium bromide electrolyte begins to form at the interface and an electrical potential difference exists between conductors operatively connected to the anode and cathode.

14 Claims, 1 Drawing Figure

U.S. Patent　　　Nov. 30, 1976　　　3,994,747
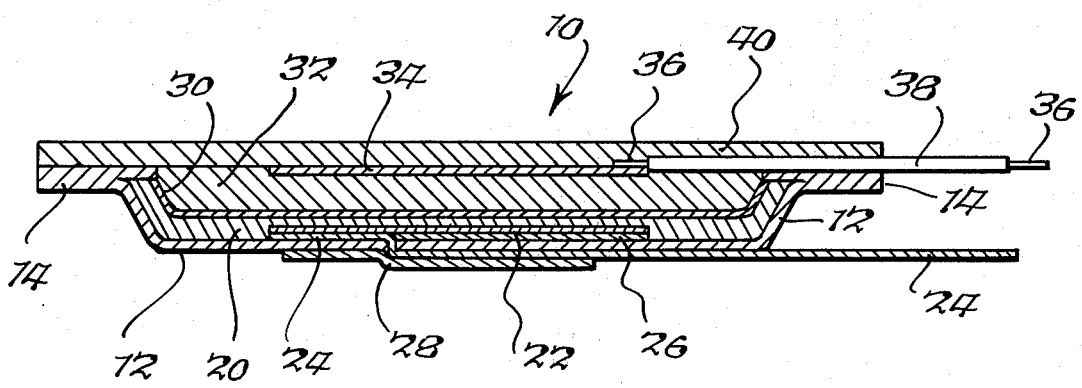

LITHIUM-BROMINE CELL

BACKGROUND OF THE INVENTION

This invention relates to the conversion of chemical energy to electrical energy, and more particularly to a solid electrolyte primary cell having a lithium anode, a bromine cathode and a lithium bromide electrolyte.

In recent times a solid electrolyte primary battery has been developed to provide relatively high voltage and high energy density in a battery which is especially useful for long life, low current drain applications. Lithium is generally recognized as the most satisfactory material for the negative electrode, i.e. the anode on discharge, in a non-aqueous cell. In selecting a material for the positive electrode, i.e. cathode on discharge, it is necessary to consider, among other factors, relative chemical activity and energy density.

SUMMARY OF THE INVENTION

It is, therefore, an object of this invention to provide a new and improved solid electrolyte battery having relatively high voltage and high energy density, and being especially useful for long life, low current drain applications.

It is a further object of this invention to provide a solid electrolyte primary cell having a lithium anode, a bromine cathode and a lithium bromide electrolyte.

It is a further object of this invention to provide a lithium-bromide cell which is relatively convenient and economical to manufacture.

The present invention provides a lithium-bromine cell comprising a lithium anode, a bromine cathode and a solid lithium bromine electrolyte. In one aspect of the invention the cathode material comprises a charge transfer complex of an organic donor component and bromine. In another aspect thereof, the cathode material comprises liquid bromine. The surface of the lithium anode which operatively contacts the cathode material can be provided with a coating of an organic electron donor component material.

The foregoing and additional advantages and characterizing features of the present invention will become clearly apparent upon a reading of the ensuing detailed description together with the included drawing wherein:

BRIEF DESCRIPTION OF THE DRAWING

The single FIGURE of the included drawing is a cross-sectional view of a lithium-bromine cell according to the present invention.

DETAILED DESCRIPTION OF THE ILLUSTRATED EMBODIMENTS

In the development of solid electrolyte batteries, lithium is recognized as a very desirable material for the negative electrode, i.e. the anode on discharge, in a non-aqueous cell. The cell of the present invention includes a lithium anode and a bromine cathode to utilize the desirable characteristics of bromine, among which are a significant degree of chemical activity, a moderately low molecular weight, and a significant level of energy density.

Referring now to the drawing, a lithium-bromine cell according to the present invention is generally designated 10 and includes a housing or casing element having a generally cup-shaped base portion 12 and a peripheral rim or flange portion 14. The base portion 12 can be of rectangular or circular configuration, and the casing is of a material which is non-reactive with bromine. One form of material found to perform satisfactorily is a fluoropolymer material commercially available under the name Halar, a trademark of the Allied Chemical Company. The cell of the present invention includes an anode in the form of a solid lithium element 20 and a current collector element 22 contracting a surface of lithium element 20. An anode lead 24 connected such as by welding at one end to current collector 22 extends out through an aperture in the housing base portion 12 making external electrical connection to a load circuit. In forming the anode for the cell of the present invention, current collector 22 is moved into position adjacent the inner surface of the base portion 12 and lead 24 is inserted through the opening and used to draw or pull current collector 22 tightly against the surface of the housing. If desired, an element or button 26 of anode material, i.e. lithium, can be placed between collector 22 and the surface of casing 12 as shown in the drawing. The current collector 22 can comprise No. 12 zirconium mesh having a thickness of about 0.004 inch and lead 24 can be a relatively thin strip of zirconium. Then lithium element 20, initially in plate or sheet form, is placed in casing portion 12 adjacent collector 22. The entire assembly then is positioned in a suitable holding fixture and then force is applied to the exposed surface of lithium element 22 in a manner forcing or extruding it along the inner surface of casing portion 12 and along the inner surface of casing portion 14 and along the inner surface of portion 14 so that it conforms to the inner surface of the casing with a resulting shape as shown in the drawing. A seal or patch 28 of suitable material, for example a fluoropolymer materially comercially available from the Dupont Company under the trademark Tefzel, can be placed over the outer surface of the housing around the aperture through which lead 24 extends and sealed in place by a suitable cement such as the cyanoacrylate cement commercially available from Techni-Tool Inc. under the designation Permabond 100. In addition, the exposed surface of lithium element 20 preferably is provided with a coating 30 of an organic electron donor component material, and the nature of coating 30 and its role in the cell of the present invention will be described in further detail presently.

The cell of the present invention further comprises a bromine cathode including a region of cathode material 32 within the assembly and operatively contacting lithium element 20 and a cathode current collector 34 operatively contacting the cathode material 32. According to a preferred mode of the present invention, the cathode material 32 comprises a charge transfer complex of an organic donor component and bromine. A preferred organic donor component is polyvinyl pyridine polymer and in particular two vinyl pyridine polymer. Cathode material 32 preferably comprises a mixture of bromine and poly-two-vinyl pyridine in a weight ratio of 6:1 bromine to polymer. The mixture is allowed to stand until it develops a rubbery consistency and is of a generally brown-red coloration. A quantity of the cathode material then is placed in the assembly in contact with the coated lithium element 20 and in an amount filling the open interior region. A cathode current collector and lead combination is positioned in the assembly and in contact with the cathode material. Cathode current collector 34, which can comprise No. 12 mesh platinum metal, is secured at the periphery such as by welding to one end of a cathode lead 36 which can be a thin strip of platinum iridium alloy, which is enclosed by a sheet of insulating material 38, for example the aforementioned Halar material, which lead 36 extends out from the periphery of the casing for making external electrical connection thereto. Then a casing closure element 40 in the form of a sheet of suitable material is placed over the end of the assembly in contact with the peripheral rim or flange 14 and the components are then heat sealed together. The marginal or peripheral portion of sheet 40 and the rim or flange 14 therefore must be of a material which is heat sealable, and this requirement is satisfied by the aforementioned Halar material. Heat sealing is performed by placing the assembly in a suitable fixture and applying a heated platen to the peripheral end or flange portion at a temperature of about 495° F ± 5° F and at a force of about 60 pounds ± 10 pounds which have been found suitable to provide an adequate seal. While heat is being applied to the periphery of the assembly, the remainder of the cell assembly can be subjected to low temperature refrigeration or gas to prevent expansion and leakage of the cathode material 32.

The lithium-bromine cell according to the present invention operates in the following manner. As soon as the bromine-containing cathode material 32 placed in the assembly operatively contacts lithium element 20, a solid lithium-bromine electrolyte begins to form at the interface, and an electrical potential difference will exist between the anode and cathode electrical leads 24 and 36, respectively, when the current collectors are in operative position. The mechanism by which the foregoing is accomplished is believed to include migration of lithium ions through the electrolyte whereby lithium is the ionic species in the cell.

Table 1 presents electrical data obtained from a lithium-bromine half cell according to the present invention as a function of cell life in days. For example, the data entered in the first row of Table 1 was obtained one day after the half cell was placed in operation. The impedance quantities indicate impedance measured at 1000 hertz, and impedance measurements were made with a 100 kilohm resistance connected in parallel with the cell under test.

Table I

| Cell Life in Days | Open Circuit Voltage In Volts | Cell Impedance In Ohms |
| --- | --- | --- |
| 1 | 3.456 | 79 |
| 5 | 3.457 | 120 |
| 7 | 3.457 | 128 |
| 14 | 3.459 | 163 |
| 19 | 3.458 | 190 |
| 26 | 3.457 | 217 |
| 33 | 3.458 | 250 |
| 41 | 3.452 | 318 |
| 51 | 3.451 | 349 |

The cathode material 32 comprising a charge transfer complex of an organic donor component and bromine is prepared in the following manner. A preferred organic donor component material is poly-two-vinyl pyridine. The mixture is prepared in a pressure-tight container having a pressure-tight closure. The polymer material is placed in the container and then the liquid bromine is added thereto, the preferred ratio by weight of bromine to polymer being 6:1. The container is closed so as to be pressure-tight and is allowed to stand for about one-half day at room temperature. The result is a rubber-like, semi-solid plastic mass with no liquid bromine result. The material is removed from the container, this generally requiring some tool or implement, and is placed into the cell assembly in a manner as described above. It has been found that mixing the bromine and polymer in a somewhat greater weight ratio of bromine to polymer, for example 7.5:1, is not satisfactory. With such a weight ratio the liquid bromine was observed not to combine readily with the polymer but to remain in liquid form. Upon standing, when the mixture was solidified, it was observed to be a very sticky plastic mass which would adhere strongly to glass containers and would release copious amounts of bromine vapor and then upon heating would release liquid bromine. When the mixture is prepared with a bromine to polymer weight ratio considerably less than 6:1, it was observed that not all of the polymer would react with the liquid bromine.

The material of coating 30 on lithium element 20 is an organic electron donor material of the group of organic compounds known as charge transfer complex donors. The material of the coating can be the organic donor used in preparing the charge transfer complex of the cathode material 32, but other materials can be employed. A preferred material for the coating is polyvinyl pyridine and it is applied to the exposed surface of lithium element 20 in the following manner. A solution of poly-2-vinyl pyridine polymer in anhydrous benzene or other suitable solvent is prepared. The poly-2-vinyl pyridine is readily commercially available. The solution is prepared with 2-vinyl-pyridine present in the range from about 10% to about 20% by weight with a strength of about 14% by weight of 2-vinyl pyridine being preferred. While 2-vinyl pyridine, 4-vinyl pyridine and 3-ethyl 2-vinyl pyridine can be used, 2-vinyl pyridine is preferred because of its more fluid characteristics in solution. When the solution is prepared at a strength below about 10% the resulting coating can be undesirably too thin and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coated anode then is exposed to a desiccant in a manner sufficient to remove the benzene from the coating. In particular the coated anode is placed in a chamber with barium oxide solid material for a time sufficient to remove the benzene, which can be in the neighborhood of 24 hours.

The following illustrative examples further describe the cells of the present invention.

EXAMPLE I

A housing for an experimental cell was provided by a length of Pyrex glass tubing having an overall length of about 3 inches and a diameter of about 2 centimeters. A pair of closure elements in the form of end plugs of Delrin material fit into opposite ends of the tubing and extend axially outwardly therefrom. The end plugs are held in place by an assembly comprising a pair of plates abutting corresponding ones of the end plugs and connected together by axially extending bolts located radially outwardly of the tubing and which are threaded at each end and connected to the plates by means of wing nuts. The anode includes two lithium disks, one having a small hole or aperture in the center thereof, which disks are sandwiched together against a zirconium screen serving as the current collector and having a lead spot-welded thereto and protruding through the center hole in the one lithium disk. The cathode current collector comprises a disk of zirconium having a thickness of about 0.030 inches and having a lead spot-welded thereto. Both the anode and cathode leads extend through central bores or channels provided in the end plugs. A mixture of bromine and poly-2-vinyl pyridine was prepared in a weight ratio of 6:1 bromine to polymer, in particular 30 grams bromine and 5 grams polymer, and allowed to stand overnight. The mixture became very rubbery and of a brown-red coloration. A plug of this material was placed inside the glass tube body of the test cell, the anode and cathode assemblies then were placed against opposite end surfaces of the cathode material, and the end plugs were inserted into opposite ends of the glass tube with the leads extending through the bores thereof. Then force was applied to the end plugs by tightening the wing nuts evenly until the cathode material was observed to fill the remaining space in the cell completely. The material occupied a region of the tube having an axial length of about ½ inch. All spaces where leaks possibly might occur were sealed with a halo carbon type grease. The pertinent electrical data which were immediately determined were an open circuit cell voltage of 2.9 volts, a voltage of 1.7 volts when connected to a 50 kilohm load, a voltage of 0.1 volts when connected to a 1 kilohm load, and a cell impedance of greater than 300 ohms. The foregoing measurements were obtained at room temperature or approximately 20° C. The test cell was placed in a warm room for approximately three days and electrical data determined again at a temperature of 98.6° F. Under these conditions, the open circuit voltage was 2.36 volts, the voltage was 2.5 volts with a 50 kilohm load, the voltage was 0.038 volts with a 1 kilohm load, and the cell impedance was greater than 1000. The cell was removed from the warm room and placed on shelf, and after about 6 weeks a measurement indicated an open circuit voltage of greater than 2 volts and a cell impedance of greater than 10,000 ohms.

EXAMPLE II

A cell wherein the cathode material was in the form of liquid bromine was built using a generally hollow rectangular casing of epoxy material and open at one end. A cathode current collector in the form of a zirconium screen was placed in the casing so as to lie along the bottom or closed end and up along both opposite sidewalls thereof. The cathode lead then extended out and over an edge of the casing. The anode was prepared by pressing a pair of lithium plates together against a zirconium screen having a lead extending therefrom, and the opposite exposed faces of the lithium plates were coated with a charge transfer complex in the same manner as described above in connection with the cell 10 shown in the drawing. The anode assembly was suspended in the center of the case and the lead was passed through an opening provided in the casing lid. The lid was provided with another opening to which was cemented a small tube extending upwardly therefrom. The lid then was cemented in place in the open end of the casing, by suitable sealant such as liquid epoxy resin material. Liquid bromine was then introduced to the interior of the casing through the tube whereupon a small plug was cemented in place in the open end of the tube to seal the bromine within the casing. The liquid epoxy resin material was used for this seal also. The initial open circuit voltage of the cell was measured at about 3.4 volts.

EXAMPLE III

A cell casing and anode assembly were provided similar to that shown in the drawing and the bromine and poly-2-vinyl pyridine were introduced in a stepwise manner. In particular, a small amount of polymer was first sprinkled into the half cell on the lithium element, then bromine was added, then a little more polymer followed by bromine, etc. This stepwise procedure was continued until the half cell was completely filled with the mixture and having a fairly smooth surface adjacent the top. A closure element was sealed in place against the top in a suitable manner, for example with a fast-setting cement, and electrical measurements of the cell performance were made. On one side of the battery the open circuit voltage was 3.1 volts, the voltage under 50 kilohm load was 1.8 volts, and voltage under 1 kilohm load was 0.3 volts. On the other side of the battery the open circuit voltage was 2.9 volts, the voltage under 50 kilohm load was 1.4 volts, and the voltage with 1 kilohm load was 0.2 volts.

It is therefore apparent that the present invention accomplishes its intended objects. While several embodiments of the present invention have been described in detail, this is done for the purpose of illustration, not limitation.

We claim:

1. A lithium-bromine cell comprising an anode consisting essentially of solid lithium, a solid electrolyte consisting essentially of solid lithium-bromide and a cathode comprising bromine, said cathode operatively contacting said anode whereby said solid electrolyte is formed at the interface.

2. A cell according to claim 1, wherein said cathode consists essentially of a charge transfer complex of an organic donor component and bromine.

3. A cell according to claim 1, wherein said lithium anode has a surface operatively contacting said cathode and wherein said cell further includes a coating on said lithium surface of an organic electron donor component material.

4. A cell according to claim 2, wherein said organic donor component consists essentially of polyvinyl pyridine polymer.

5. A cell according to claim 2, wherein said organic donor component consists essentially of poly-two-vinyl pyridine polymer.

6. A cell according to claim 2, further including a coating of an organic electron donor component material on said solid lithium anode and operatively associated with said cathode.

7. A cell according to claim 3 wherein said cathode consists essentially of a charge transfer complex of an organic donor component and bromine.

8. A cell according to claim 3, wherein said organic donor component consists essentially of polyvinyl pyridine polymer.

9. A cell according to claim 3, wherein said organic donor component consists essentially of poly-two-vinyl pyridine polymer.

10. A cell according to claim 5, wherein the weight ratio of bromine to poly-two-vinyl pyridine polymer is 6:1.

11. A cell according to claim 6, wherein said coating is of the organic donor component material of said charge transfer complex material.

12. A cell according to claim 7, wherein said coating is of the organic donor component material of said charge transfer complex material.

13. A cell according to claim 12, wherein said organic donor component material consists essentially of polyvinyl pyridine polymer.

14. A cell according to claim 12, wherein said organic donor component material consists essentially of poly-two-vinyl pyridine polymer.

* * * * *